United States Patent [19]

Barstow

[11] Patent Number: 5,448,630
[45] Date of Patent: Sep. 5, 1995

[54] SECURE PROGRAMMABLE TELECOMMUNICATION TIMER

[76] Inventor: L. Ed Barstow, Box 2200 S. Haven Rd., Claremore, Okla. 74017

[21] Appl. No.: 129,304

[22] Filed: Sep. 30, 1993

Related U.S. Application Data

[63] Continuation-in-part of Ser. No. 730,105, Jul. 15, 1991, abandoned.

[51] Int. Cl.$^6$ ............................................. H04M 1/66
[52] U.S. Cl. .................................... 379/199; 379/445; 379/200
[58] Field of Search ............... 379/199, 200, 168, 190, 379/194, 445, 442

[56] References Cited

U.S. PATENT DOCUMENTS

| | | | |
|---|---|---|---|
| 3,508,392 | 4/1970 | Temps, Jr. | 379/131 |
| 3,702,903 | 11/1972 | Barton | 379/200 |
| 3,727,007 | 4/1973 | Catlin | 379/200 |
| 4,251,692 | 2/1981 | Waldman | 379/200 |
| 4,260,855 | 4/1981 | Rubinstein | 379/140 |
| 4,297,534 | 10/1981 | Epstein et al. | 379/200 |
| 4,405,839 | 9/1983 | Groff | 379/188 |
| 4,480,154 | 10/1984 | Klee | 379/422 |
| 4,607,900 | 8/1986 | Andrews et al. | 379/445 |
| 4,683,583 | 7/1987 | Kossor | 379/200 |
| 4,771,452 | 9/1988 | Carlson | 379/190 |
| 4,924,499 | 5/1990 | Serby | 379/200 |
| 4,924,512 | 5/1990 | Sizemore et al. | 379/200 |
| 5,062,134 | 10/1991 | Laird | 379/199 |

FOREIGN PATENT DOCUMENTS

| | | | |
|---|---|---|---|
| 3347331 | 7/1985 | Germany | 379/199 |
| 56-89161 | 7/1981 | Japan | 379/199 |
| 1-248858 | 10/1989 | Japan | 379/199 |

*Primary Examiner*—Thomas W. Brown
*Assistant Examiner*—Ahmad F. Matar
*Attorney, Agent, or Firm*—Head & Johnson

[57] ABSTRACT

A secure timed telephone switch apparatus for a telephone or telecommunication device wired to a telephone system circuit by at least one pair of wires, one wire being supplied with voltage. The apparatus includes a clock that may be set to provide a signal at predetermined times during a 24 hour period and during a 7 day period. A central processing unit programs and stores information for the predetermined times of the clock. A switch mechanism connected to the voltage supplied wire is responsive to the signal to switch between connection and disconnection of the telephone system circuit, the switch operably engaged with the clock and the central processing unit so that the telephone or telecommunication device will be disconnected and connected to the telephone system in response to the signal.

9 Claims, 6 Drawing Sheets

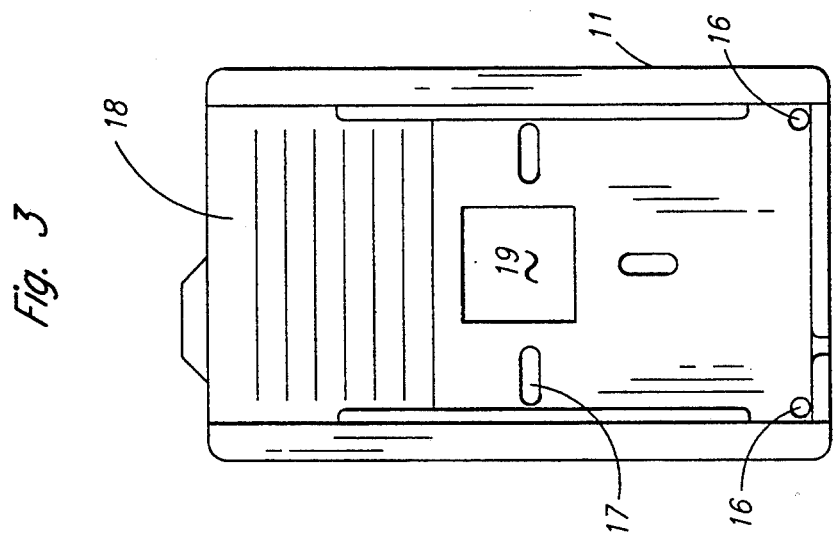
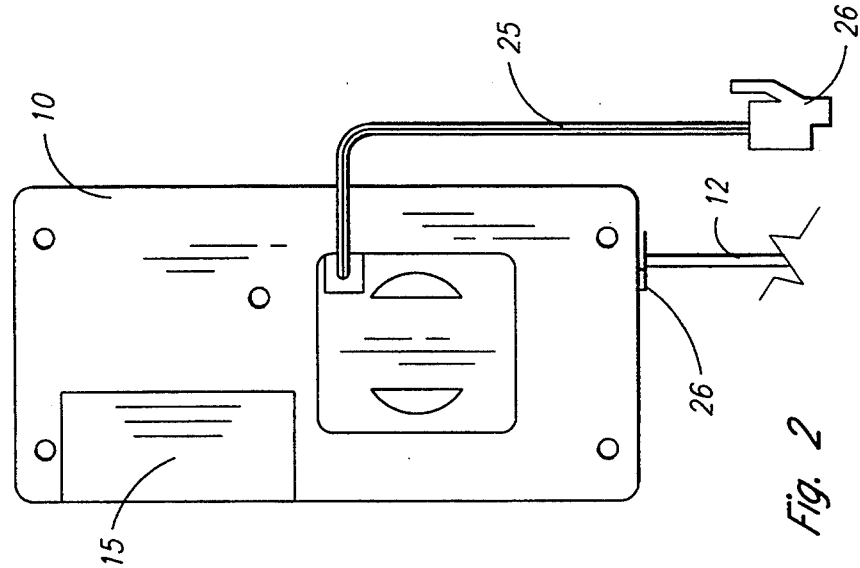
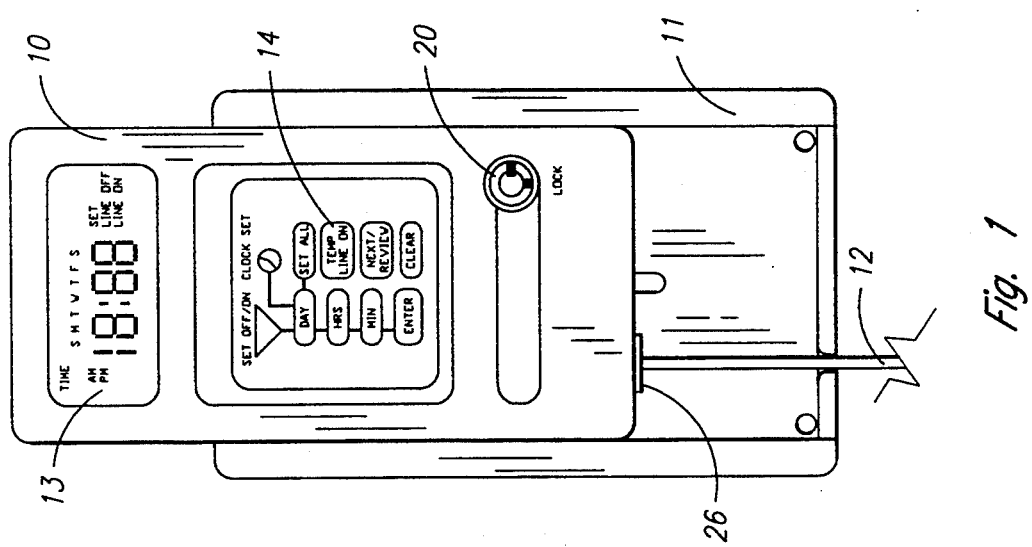

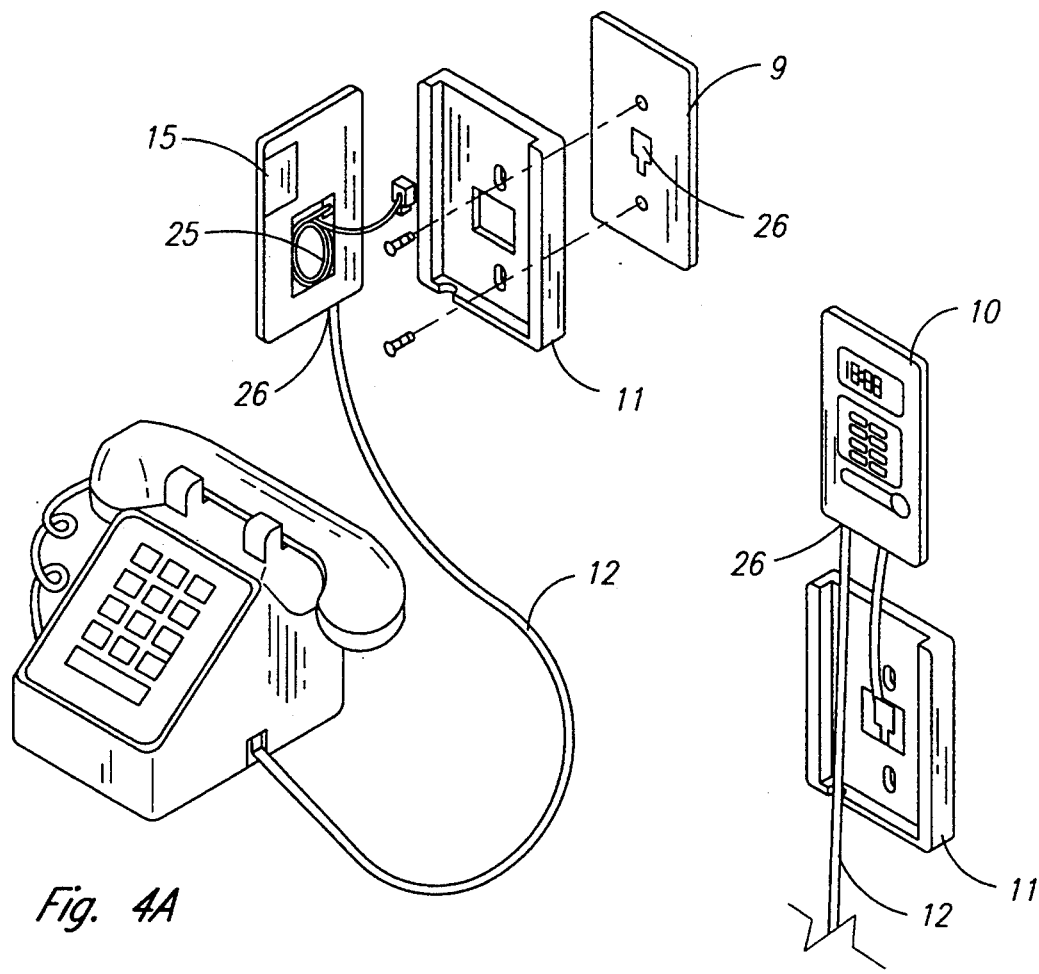
Fig. 4A
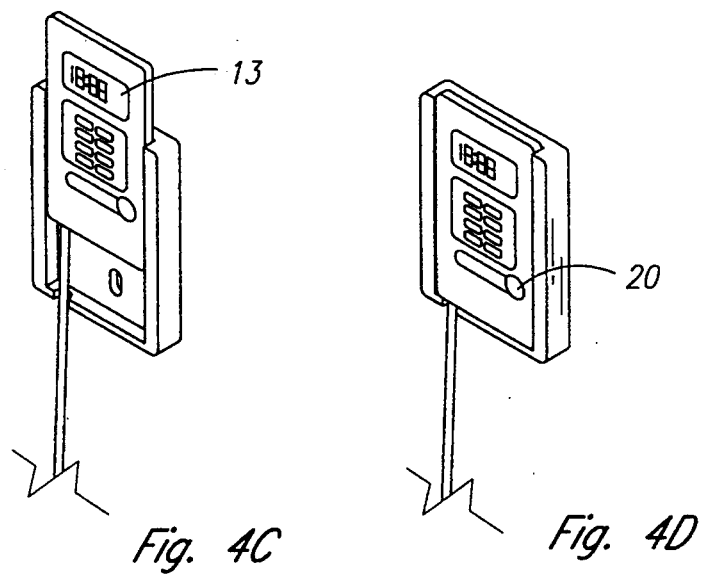
Fig. 4B
Fig. 4C
Fig. 4D

SEGMENT TABLE

| PIN | COM0 | COM1 | COM2 |
|---|---|---|---|
| 1 | | COM1 | |
| 2 | | 1BC | |
| 3 | S(1) | 2F | 2E |
| 4 | | COLON | |
| 5 | T(1) | 3F | 3E |
| 6 | T(2) | 4F | 4E |
| 7 | SET | LINE OFF | LINE ON |
| 8 | PROGRAM | | LO BAT |
| 9 | | | COM2 |
| 10 | S(2) | | |
| 11 | F | 4B | 4C |
| 12 | 4A | 4G | 4D |
| 13 | W | 3B | 3C |
| 14 | 3A | 3G | 3D |
| 15 | M | 2B | 2C |
| 16 | 2A | 2G | 2D |
| 17 | TIME | AM | PM |
| 18 | COM0 | | |

| Fig. 5B |
| Fig. 6 |
| Fig. 7 |

# SECURE PROGRAMMABLE TELECOMMUNICATION TIMER

This is a continuation-in-part of application Ser. No. 07/730,105 filed Jul. 15, 1991, entitled "Timed Telephone Switch Device", which is now abandoned.

BACKGROUND OF THE INVENTION

1. Field of the Invention

The present invention is directed to a timed telephone switch apparatus which is wired to a telephone or other telecommunication device.

2. Prior Art

Over the past 20 years, telephones have become one of the most important appliances in homes around the world. The average person spends two hours per day on the telephone. The average teenager spends 5.5 hours per day on the telephone. Parents have become answering services for their children and, to be sure that calls are still coming through they have installed added features such as "call waiting", to allow friends or other family members to get through when the line is busy. In many cases, this just allows the child to keep one friend on hold while talking to another. To solve this problem, many parents have installed a private line for the children.

With a children's private line parents have the use of their phone but have very little knowledge of when the children are on the phone. Children don't watch the clock and will talk late into the night without supervision. Having been faced with this problem, I invented a secure programmable switch device that will stop all outgoing and incoming calls at a designated time. Once programmed and locked changes cannot be made without the key.

This invention pertains to the concept of controlling telecommunication equipment by use of a timer or clock but, it provides a new ability to stop both incoming and outgoing calls at programmed times, with complete security.

The idea of affecting the availability of power to electrical appliances, lighting and other appliances including television and telephones, by use of a timer has been implemented in a variety of ways. The control of a telephone or piece of telecommunication equipment in this manner has also been implemented.

For example, U.S. Pat. No. 4,251,692 to Waldman describes an apparatus for restricting calls placed onto a telephone line wherein an off-hook condition begins operation of the apparatus and energizes a control circuit which can disable or allow a call by counting the amount of numbers entered into the call. When a predetermined count is reached, the disabling circuit is energized to prevent further calling.

U.S. Pat. No. 4,924,499 to Serby describes a programmable time control for disabling a telephone ringer at preprogrammed times, while automatically and independently allowing outgoing calls. Control of both incoming and outgoing calls may be reprogrammed by the user without any means other than the ability to change the timer. The controlled telephone may also be easily unplugged from modular jack 40 and simply moved to another wall jack that is not controlled.

U.S. Pat. No. 5,062,134 to Laird describes a device for automatically controlling the cumulative time of use of a telephone. Control switches may be set to select the amount of cumulative time phone may be used in a 24 hour period. Device times each call and disconnects after conversation has reached programmed period of time (for example 30 minutes). After total cumulative time allotted for each 24 hour period the line is automatically disconnected and the telephone cannot be used until automatically reset at the beginning of the next 24 hour period (such as 12:01 AM). Japanese Pat. No. 56-89161 describes a timing device which will disable a telephone for restricting incoming calls during programmed times, for persons, without personal override code. Override is manual and non secure for outgoing service.

Japanese Pat. No. 1-248858 describes a device which may shut off both incoming and outgoing calls by turning the device off or on with a key. This device stops premium calls which use the prefixes 900, 976 or any non-local call or will restrict the length of a call.

German Pat. No. 85-166091/28 describes a device which will disable the telephone at a time designated by user by the use of a timing circuit. It allows for one off time and one on time. Thus, prior art does not include a timed switch device which will disable a telephone or a piece of telecommunications equipment at preprogrammed times designated by user, with total security. The prior art does not include a timed switch device which will not allow incoming or outgoing service during the off period, unless override is accessed by users key. As every parent and small business owner knows, such a product is very desirable in order to stop late night calls which wake up sleeping children, stop late night conversations by children, set study times for children insuring they will not be disturbed by the phone. Small businesses could secure telephones after hours to insure housekeeping and security personnel are not using phones, FAX machines or computer modems for personal use. Controlling use of computer modems is also desirable to many parents. Security of telephones in college dorm rooms is desirable to many college students that have been stuck with high phone bills for calls they didn't make.

Therefore, a need exists for a completely secure, inexpensive, practical, simple to program device which will disconnect and reconnect a telephone, or a piece of telecommunication equipment, at numerous programmed times throughout the day and week, dependent on authorized users' schedule, or which will disconnect a telephone, or piece of telecommunications equipment, for a period of several days or weeks to insure no use by unauthorized persons during weekends or vacations.

SUMMARY OF THE INVENTION

The present invention consists of two segments, a mounting bracket segment or holster which mounts on the telephone wall jack and a central processing unit. Once installed, the holster covers the wall jack, except for an opening allowing access to an RJ11 female receptacle, denying access to the wall receptacle without a key.

The central processing unit segment is locked into the holster by means of a keyed lock. To remove, the key is inserted and turned clockwise. This opens the mechanical lock allowing the central processing unit segment to be removed from the holster and electrically unlocks the central processing unit keyboard.

Enclosed in the apparatus is a micro-controller and clock, powered by two "AA" Alkaline batteries at 3.0 volts DC. Clock generation for the microcontroller is provided by two separate oscillator circuits. The Liquid Crystal Display is driven directly from the micro-controller displaying time of day, day of week, line on or line off icons, program, battery and clock set icons, with "time", "day of week" and "line on" or "line off" icons being displayed at all times during operation. Also enclosed in the apparatus is a program chip which allows storage of user programmed instructions.

The telephone line circuit is completed or disconnected by a relay under control of the micro-code program chip. The two-wire telephone line is received by a line cord extending from the central processing unit segment from a standard modular telephone jack and presented to separate poles within the relay. The outputs of each pole are then presented to an RJ11 jack on the central processing unit for connection to a telephone device.

Switching both wires of the telephone circuit provides complete disconnection isolation from the telephone line to the telephone device. The relay is a magnetic latching type needing only to be energized momentarily for OFF or ON states. The ON state (telephone line closed or enabled) is energized by pulsing an "on state" coil winding within the relay by a transistor via a current limiting resistor from the micro-controller. The OFF state (telephone line open or disabled) is energized by pulsing a separate "off state" coil winding within the relay by a transistor via a current limiting resistor from the micro-controller. The last state energized by the micro-controller is latched (remembered) by magnets within the relay without requiring sustained power via the transistors from the battery, hence conserving battery life. Programming of the apparatus is user friendly by using graphics matching the keyboard graphics. To set the clock, the user presses the CLOCK key, on the keyboard, which lights the clock set icon on LCD display.

The user then presses the DAY key to display the proper day, presses the HOUR key to the proper hour, AM or PM, and the MINUTE key to the proper minute. When the proper time is displayed, ENTER is pressed, thereby logging the current time into the program chip.

To set OFF/ON times, the user presses the SET OFF/ON key. A PROGRAM and LINE OFF icon will appear on the LCD along with a day of the week icon. To continue, the user will press the DAY key to the desired day, press the HOUR and MINUTE keys to desired OFF time and press ENTER. The LINE ON icon will appear on LCD. The user will then press the DAY key for desired day, press HOUR and MINUTE keys for desired ON time and ENTER key to log selection in to the program chip.

This procedure will be repeated for each day, if different times on each day are desired. If you desire the OFF/ON times to be the same each day, press the SET ALL key prior to setting OFF and ON times and the apparatus will open and close the relay at the same time each day of the week until reprogrammed.

This apparatus controls a phone device for a period of several days or weeks. To put a telephone device out of service for several days, the user will press SET OFF/ON key, press the DAY, HOUR and MINUTE keys to the time it is desired the phone device to be out of service, then press ENTER key. Press DAY, HOUR and MINUTE keys to the date you will return and would like service restored, then press the ENTER key. The telephone, or other piece of telecommunications equipment connected to the switch will be out of service for the programmed period of time.

Once programmed, the central processing unit segment is slid into the retainer track on the holster, the modular jack on the central processing unit is plugged into the wall outlet, and the telephone device is plugged into the central processing unit segment, thereby completing the connection. The central processing unit segment is locked securely into the holster by turning the key counter clockwise, also disabling the keyboard.

Once programmed and installed, the present invention will effectively control service of a telephone, telecopier, computer modem or any similar type of telecommunication equipment at the desire of the owner.

The present invention is equipped with an alarm, which will sound 60 seconds prior to disconnection, to allow a normal end to the conversation and no abrupt interruptions in service. Once the alarm sounds, the LCD will display a countdown in seconds from 60 to 0 allowing the user to see the time remaining.

Another objective is that the telephone or telecommunication device is secure from unauthorized users so that no one without a key may use the equipment during the OFF times. Authorized persons, with a key may turn the key to the right to engage the keyboard, press the TEMP LINE ON key for 10 minutes of access the to phone during LINE OFF period. A further objective of the present invention is the ability to apply the same general concept in a variety of designs and physical embodiments to fit various modes of telephone and telecommunication equipment service. To that end, the apparatus described herein may be used for a single, double or multi-line system. It can be designated to receive power from any system, including AC or DC in addition to battery.

Various other purposes and advantages of this invention will become clear from its description in the specifications that follow, and from features particularly pointed out in the appended claims. Therefore, to the accomplishment of the objectives described herein above, this invention consists of the features hereinafter illustrated in the drawings and examples, fully described in the detailed description of the preferred embodiment and particularly pointed out in the claims. However, such drawings and description disclose but one of the various ways in which the invention may be utilized.

BRIEF DESCRIPTION OF THE DRAWINGS

FIG. 1 is a front view of a secure programmable telecommunication timer apparatus, a central processing unit segment sliding into a mounting bracket or holster, toward the locked position;

FIG. 2 is a back view of the central processing unit segment apart from the apparatus with telephone device cord plugged into bottom right;

FIG. 3 is a front view of the mounting bracket or holster showing a square opening for connection to the telephone wall jack, screw holes for various secure connections to wall jack, track sliders for mounting the central processing unit segment and location for programming instructions.

FIG. 4(a-d) is a simplified sketch of a telephone and the sequential steps to install the present invention;

DETAILED DESCRIPTION OF THE PREFERRED EMBODIMENTS

Figures 5, 5B:
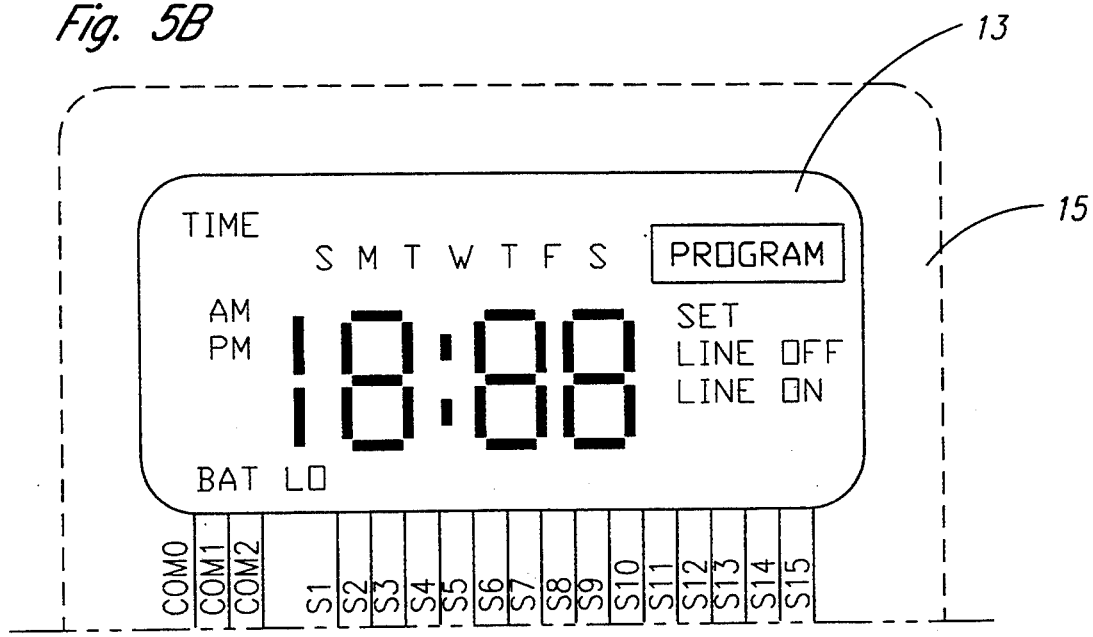
FIG. 5(a-b) shows pin connections and segment table for custom LCD as connected to the micro-processor of the secure programmable telecommunication timer.

The essence of the present invention is the application of controlled times for telephone usage, and the ability to program by the week, with complete security, stopping unauthorized users from making or receiving calls.

In this invention, a mounting bracket or holster is installed directly on the telephone wall outlet, with the same screws that are used to hold the existing trim plate. The central processing unit module slides into the mounting bracket or holster. An external RJ11 type male telephone jack, extending from the back of the central processing unit, plugs into the wall telephone jack. The connecting wire from the telephone, or telecommunications device, plugs into a receptacle in the bottom of the central processing unit segment, completing the circuit. The central processing unit segment is securely locked into place by a keyed lock which mechanically locks the central processing unit segment into place, securing the telecommunication device connecting wire and the wall jack connection, and electrically disabling the central processing unit keyboard, insuring that the program cannot be changed without the key.

To program the desired times of service, the central processing unit is removed from the holster by turning the key clockwise, sliding the central processing unit up and out of the holster, disconnecting the telephone or telecommunications device, and the external connection from the central processing unit to the wall outlet. The apparatus may be programmed by following the simple, easy to understand programming instructions located in the holster.

Once programmed, the unit will retain input instructions in the program chip and will disconnect and reconnect service to the telephone, or other telecommunication device, to which it is connected indefinitely.

Referring to the drawings in detail, wherein like parts are designated throughout with like numerals, FIG. 1 shows a front view of the apparatus with the central processing unit segment module 10 sliding approximately two-thirds of the way into the mounting bracket or holster 11. The connecting wire 12 for the controlled telephone is shown connected to the bottom left of the central processing unit segment 10 by means of an RJ11 modular jack 26.

A Liquid Crystal Display (LCD) 13, which is custom made for this invention, will custom display icons for Time of Day, AM or PM, Day of Week, OFF/ON times during programming, Program which is illuminated during a program function only, Set which illuminates during the clock set or set OFF/ON function, Line Off which illuminates when programming OFF times, Line On which illuminates when programming ON times and Low Bart which illuminates after 48 weeks of use to remind owner to replace batteries to insure continuous uninterrupted service.

The central processing unit segment 10 is shown apart from the apparatus in FIG. 2. The back of the central processing unit segment 10 (seen in FIG. 2) shows a rear view of central processing unit segment 10 with a battery compartment 15 allowing easy access to install two "AA" alkaline batteries.

A two wire lead 25, capped with an RJ11 male telephone jack 26, is provided for connection to the wall telephone outlet receptacle. A connecting wire 12 from the telephone or telecommunication device is connected to the bottom right of the central processing unit segment 10 with a standard RJ11-type modular jack FIG. 3 shows the mounting bracket or holster 11 with the central processing unit segment removed revealing mounting screw holes 17, for mounting directly to the existing telephone wall plate, and mounting screw holes 16, for mounting directly to the wall. Programming instruction card 18 slides into a specially designed insert at the top of the holster. A one inch square opening 19 in the back center of the holster, allows access to the telephone wall receptacle for installation of central processing unit segment 10.

FIG. 5 shows one sequential installation of the secure programmable timer of the present invention.

Figure 6:
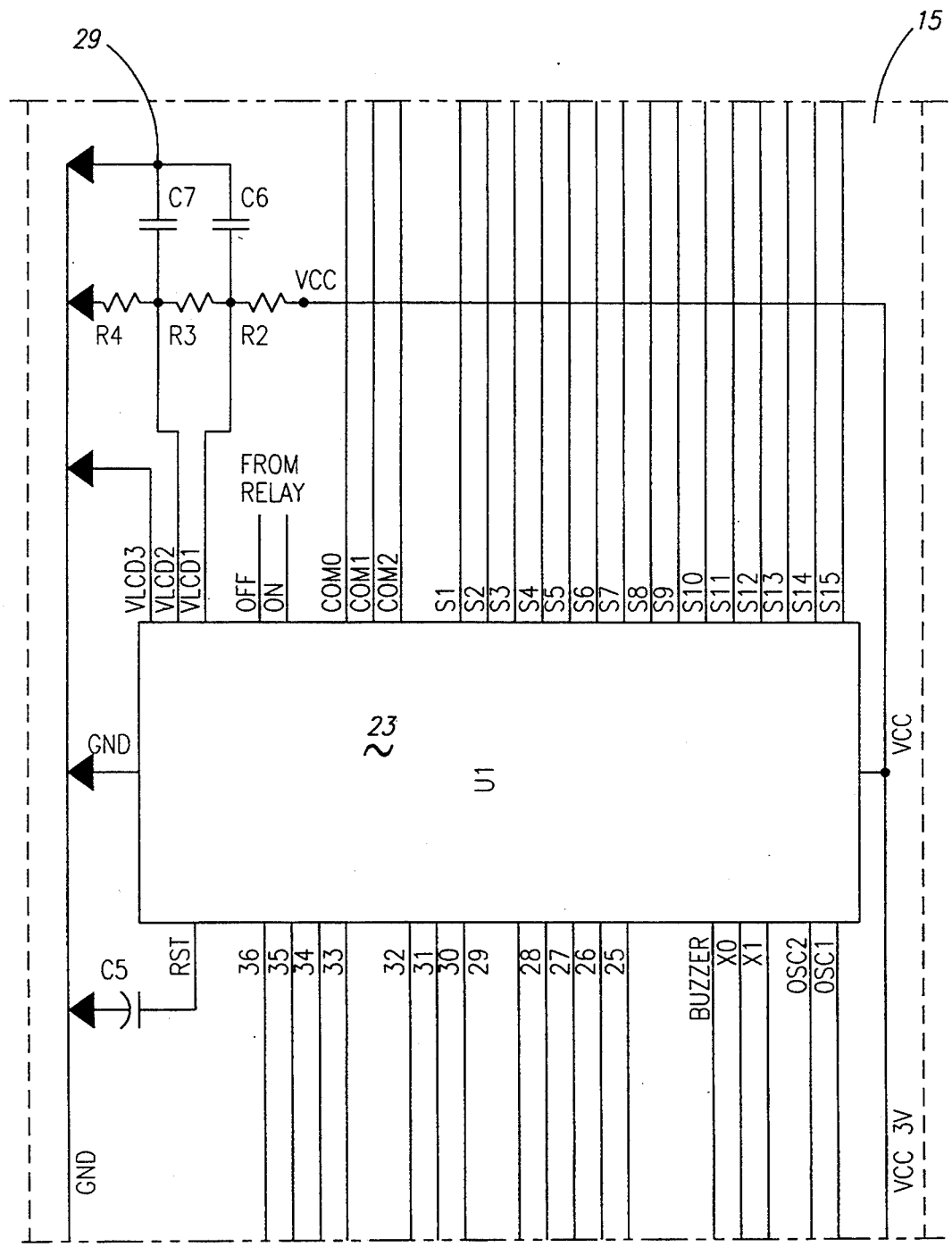
FIG. 6 illustrates the circuitry showing pin connections to the microprocessor of the present invention.
Figure 7:
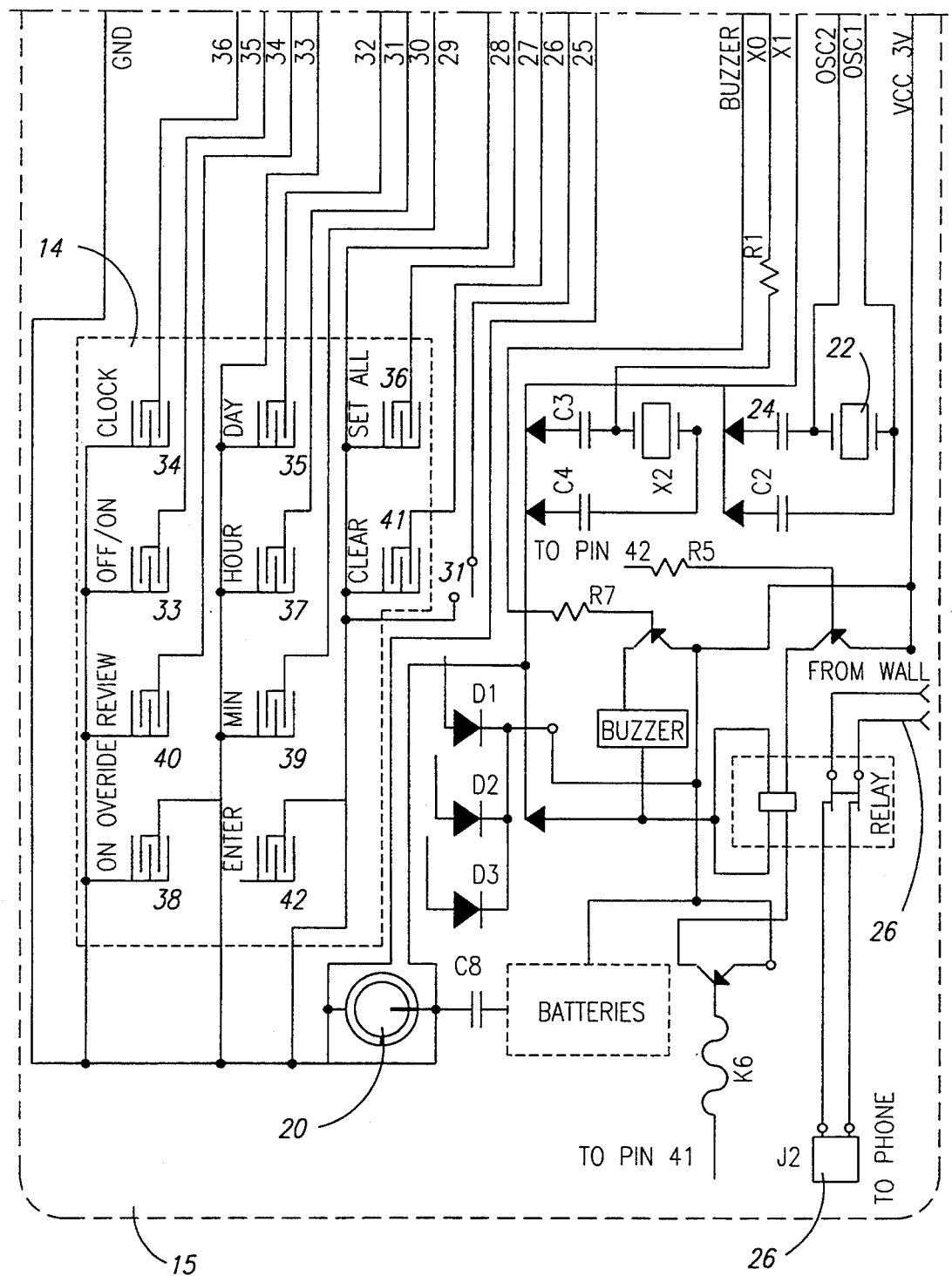
FIG. 7 illustrates the circuitry of the timing mechanisms and switching relays of the present invention.

The electronic keyboard 14 (See FIGS. 1) consists of 10 membrane keys interfaced directly to the micro-controller circuitry. The circuitry is illustrated in FIGS. 6 and 7.

A switch 31 on the key lock 20, controls power to the keyboard, disabling it when in the locked position. The keyboard contains 10 command keys the SET OFF/ON command is used to set all programmed OFF/ON times. The CLOCK SET command is used to set Time of Day only. The DAY command is used to set day of week during Clock Set and Set OFF/ON modes. The SET ALL command is used to set all OFF/ON times on the same times each day. The HRS command is used to set hours on Clock Set and Set OFF/ON modes. The TEMP. LINE ON command is used to override the Line Off mode for a period of ten minutes for additional time or answering an answering machine call. The MIN command is used to set minutes in both Clock Set and Set OFF/ON modes. The NEXTREVlEW command is used to review OFF/ON times programmed in memory chip. The ENTER command is used to place programmed information into the memory chip after each set function. The CLEAR command is used to clear a cycle (one OFF/ON time) from the memory.

All keys are biased to 3 V by internal resistors within the microcontroller. Pressing a key closes a circuit via the membrane contact. The lock Key 20 is closed in the unlock position 24 creating an internal instruction cycle time of 8 microseconds. The run mode oscillator is active, or oscillating only during run mode and stopped during stop mode for power conservation. The real time oscillator 24 (shown as X1,X2 in FIG. 7), is set by crystal X2 and loaded by capacitors C3 & C4 25 with resistor R1 for DC current limiting. The real time oscillator runs whenever power is applied and supports the timer for time of day, the audio oscillator for a tone of 2 kilohertz and the LCD multiplexing logic for a refresh frequency. The oscillator is also used to bootstrap the microcontroller into run mode on demand by interrupts created by the internal timer for real time clock updating and keyboard activity by the central processing unit segment indicating to the micro-controller to allow keyboard functions. Otherwise the keyboard is ignored when locked. This feature provides security of the internal user, programming to only users with a key.

Locking the keyboard also disables interrupts from other keys, disallowing a wake up from standby mode, hence conserving power in case of tampering.

Audible tones are generated by a piezo-electric transducer BUZZER driven by a transistor (shown as Q3) via a current limiting resistor 46 by the microcontroller under the control of the micro-code chip. The BUZZER is driven at 2 kilohertz for periods of 10 microseconds and 100 milliseconds for a "click" and a "beep" respectively. The "click" is used upon pressing keys as a tactile feedback for the user. The "beep" is used for error and warning indications, such as an invalid programming cycle sequence or a forthcoming time expiration warning one minute prior to OFF mode. When the OFF signal sounds, a 60 second countdown begins on the LCD giving the user ample time to end the call. The telephone line circuit is completed or disconnected by a relay (K1) 43 under control of the microcode by the user's programming. The two wire telephone line is received by a line cord on the back of the central processing unit from a standard modular telephone jack 26 and presented to separate poles within the relay 43. The outputs of each pole are then presented to an RJ11 jack 26 on the central processing unit segment 10 for connection to a telephone or telecommunication device.

Switching both wires of the telephone circuit provides complete disconnection isolation from the telephone line to the telephone device. The relay 43 is a magnetic latching type needing only to be energized momentarily for OFF or ON states. The ON state (telephone line closed or enabled) is energized by pulsing an "on state" coil winding within the relay 43 by a transistor 44 via a current limiting resistor from the micro-controller. The OFF state (telephone line open or disabled) is energized by pulsing a separate "off state" coil winding within the relay 43 by a transistor 45 via a current limiting resistor from the micro-controller.

The last state energized by the micro-controller is latched or remembered by magnets within the relay 43, without requiring sustained power via the transistors 44 or 45, from the battery, hence conserving battery power.

As seen most clearly in FIG. 6, the central processing unit segment is controlled by a single-chip micro-controller 23, powered by two "AA" alkaline batteries at 3.0 volts. Typical power consumption is 25 micro amps in standby and 250 micro amps in run modes yielding 1.1 years of battery life, respectively. As a precaution for time aging and other external environmental conditions, a "LOW BATT" icon is illuminated in the LCD. After 48 weeks of use, a reminder for battery replacement is given.

Clock generation for the micro-controller is provided by two separate oscillator circuits. The main run mode oscillator (OSC1, OSC2) is set at 1,000 Megahertz by ceramic resonator 22 and loaded by capacitors 24.

The LCD is driven directly from the micro-controller in a tri-multiplexed mode with a matrix organization of 3×15 segments. Circuitry to the LCD is provided by a printed circuit board with connections to pins, on the microcontroller. The four level AC drive (Vcc, VLCD1, VLCD2 & VLCD3) is performed internally by the micro-controller using levels of 3,2,1 and 0 volts set by Vcc (3 v), a resistor divider (R2, R3, & R4), 29, for 2 V, 1 V and Vss (0V) respectively. Capacitors (C6 & C7) provide bypass filtering for the derived 2 V and 1 V reference levels. The LCD utilizes 38 segments of the possible 45 in the 3×15 matrix.

The keyboard 14 consists of 10 user membrane keys interfaced directly to the micro-controller. With reference to FIG. 7, a switch on the key lock 20 and a test point 31, (not user accessible), completes a group of 12 bits divided into three four bit ports of the micro-controller 23 (pins 25 through 36).

The port keys (Set Clock 34, Set OFF/ON 33, Review/Next 40 & On Override 38), provide an external interrupt function to the micro-controller 23, enabling wakeup from standby mode for authorized user intervention. The remaining ports must be programmatically scanned by microcode reading. All keys are biased to Vcc (3 v) by internal resistors within the micro-controller. Pressing a key closes the circuit via the membrane contact to Vss (0 v). The lock key is closed in the unlock position indicating to the microcode to allow keyboard functions, otherwise the keyboard is ignored when the lock key is in the locked position. This feature provides security of the internal user programming to only authorized users with a key. Locking the keyboard also disables interrupts from other keys, disallowing a wakeup from standby mode, hence conserving power in case of tampering.

Referring to the timer and program functions of this invention, FIG. 1 shows the program keys and information icons.

Figure 8:
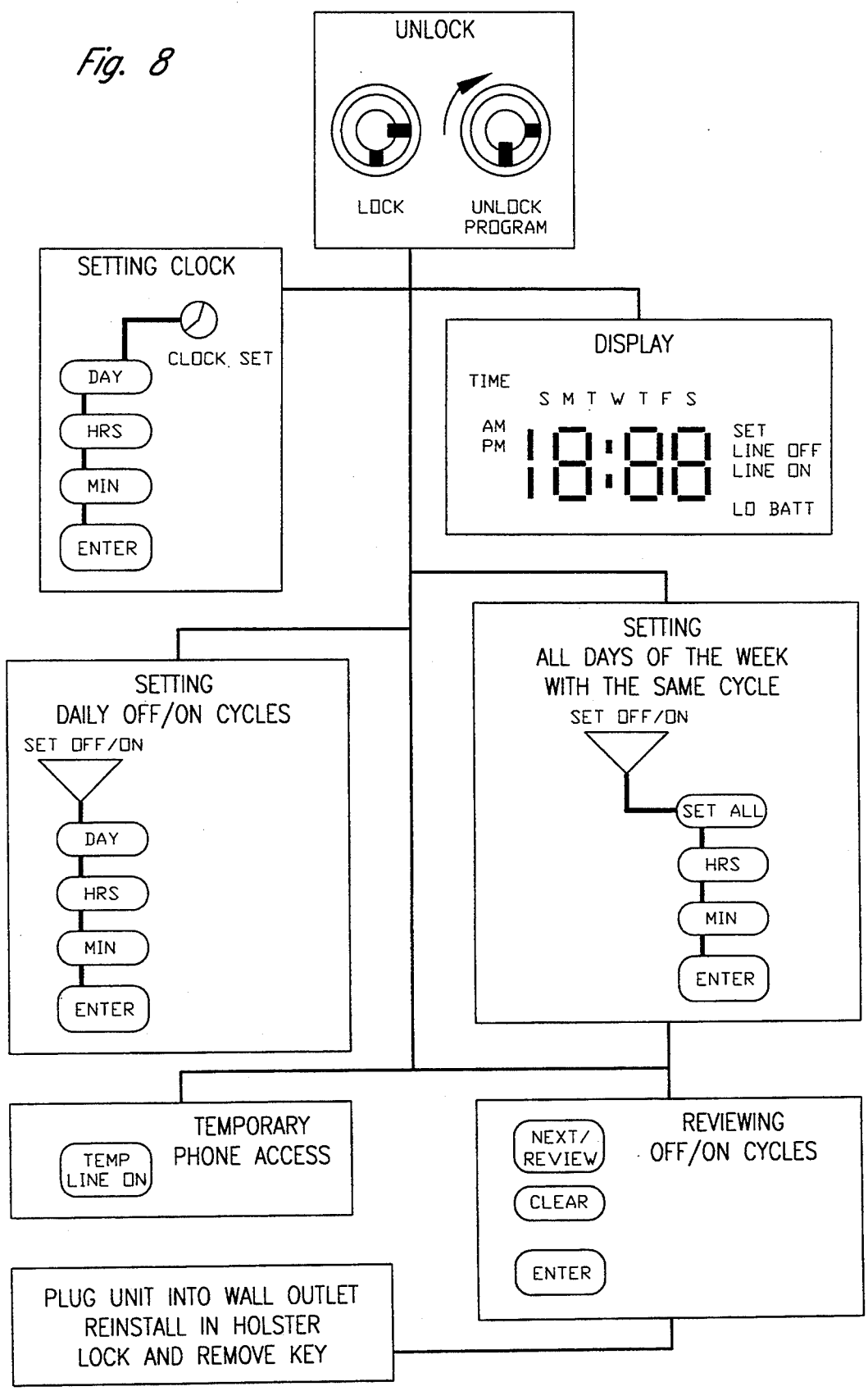
FIG. 8 illustrates a sequential flowchart of the steps of programming of the apparatus.

FIG. 8 shows a flowchart of instructions for programming of the secure programmable telecommunications timer.

Initially, the key in the key lock will be turned counterclockwise to unlock the central processing unit segment from the holster and enable operation of the keyboard. Any keyboard operation that is in progress is terminated upon locking of the key lock. Once unlocked, the central processing unit segment is removed from the holster or bracket. The cord may then be unplugged from the wall outlet.

Thereafter, the clock will be set. The arrow button is pressed and the SET icon will display. The day, hour and minute will be entered.

Day off and on cycles or all days of the week cycles may be set. The on/off cycles may be reviewed by pressing the NEXT/REVIEW key. Temporary phone access may be allowed once during a LINE OFF cycle.

Once the desired programming is completed, the central processing unit or programmer segment is reinstalled in the holster.

Whereas, the present invention has been described in relation to the drawings attached hereto, it should be understood that other and further modifications, apart from those shown or suggested herein, may be made within the spirit and scope of this invention.

What is claimed is:

1. A secure timed telephone switch apparatus for a telephone or telecommunication device, said apparatus being wired to a telephone system circuit by at least one pair of wires, one of said wires being supplied with voltage, which apparatus comprises a mounting bracket and a programmer segment, said programmer segment including:
   a. clock means that may be set to provide a signal at predetermined times during a 24 hour period and during a 7 day period;
   b. central processing unit means powered by a power supply to program and store information for said predetermined times of said clock means;

c. switch means connected to said voltage supplied wire responsive to said signal to switch between connection and disconnection of said telephone system circuit, said switch means operably engaged with said clock means so that said telephone or telecommunication device will be disconnected from said telephone system circuit and connected to said telephone system in response to said signal at said predetermined times;

d. keyboard means interfaced directly with said central processing unit means to program and control said central processing unit;

e. display means displaying current time of day from said clock means and program information from said central processing unit; and f. key lock means connected directly to the central processing unit means to allow said keyboard means to function when unlocked and to ignore keyboard functions when locked and to mechanically secure said programmer segment when locked.

2. A secure timed telephone switch apparatus as set forth in claim 1 wherein said central processing unit means and said clock means power supply include 2 "AA" Alkaline batteries.

3. A secure timed telephone switch apparatus as set forth in claim 1 wherein said central processing unit means includes a single-chip micro-controller.

4. A secure timed telephone switch apparatus as set forth in claim 1 wherein said display means includes a 24 hour digital liquid crystal display (LCD) readout.

5. A secure timed telephone switch apparatus as set forth in claim 1 wherein said keylock means is movable between said locked and unlocked position by a key.

6. A secure timed telephone switch apparatus as set forth in claim 1 wherein said telephone or telecommunication device may be wired to said switch apparatus with a female modular jack located within said programmer segment.

7. A secure timed telephone switch device as set forth in claim 1 wherein said mounting bracket includes a plurality of screw holes located to match common locations on telephone wall jacks.

8. A secure timed telephone switch device as set forth in claim 1 wherein said programmer segment is user friendly and easy to program.

9. A secure timed telephone switch apparatus for a telephone or telecommunication device, said apparatus being wired to a telephone system circuit by at least one pair of wires, which apparatus comprises:

(a) a mounting bracket;

(b) a central processing unit segment programmable to control a timer connected to a switch which can disconnect said telephone system circuit for selected time periods, said timer and switch on said central processing unit segment;

(c) means to lock the central processing unit segment into the mounting bracket; and (d) keylock means to mechanically secure the central processing unit segment when locked into the mounting bracket and to prohibit programming of the central processing unit segment without unlocking said central processing unit segment from said bracket.

* * * * *